United States Patent [19]
Miyamoto

[11] Patent Number: 5,080,474
[45] Date of Patent: Jan. 14, 1992

[54] LASER BEAM SHAPING DEVICE

[75] Inventor: Isamu Miyamoto, No. 1-12, Yonban-cho, Koshien, Nishinomiya-shi, Hyogo, Japan

[73] Assignees: Isamu Miyamoto, Hyogo; Nippei Toyama Corporation, Tokyo, both of Japan

[21] Appl. No.: 457,678

[22] Filed: Dec. 27, 1989

[30] Foreign Application Priority Data

Dec. 27, 1988 [JP] Japan .................... 63-330680

[51] Int. Cl.⁵ .............................................. G02B 3/04
[52] U.S. Cl. ................................................... 350/433
[58] Field of Search ............... 350/433, 434, 320, 630, 350/619, 6.8, 486

[56] References Cited
U.S. PATENT DOCUMENTS 4,547,044 10/1985 Jain et al. ........................ 350/433

*Primary Examiner*—Paul M. Dzierzynski
*Attorney, Agent, or Firm*—Sughrue, Mion, Zinn Macpeak & Seas

[57] ABSTRACT

A laser beam shaping device is made up of a multiple reflecting mirror unit with reflecting surfaces facing each other to reflect a laser beam in multiple reflections, a light gathering cylindrical lens for gathering the laser beam near the inlet of the multiple reflecting mirror unit, a spherical lens for focusing the laser beam emerging from the multiple reflecting mirror unit, and a beam width setting cylindrical lens for setting the width of the laser beam in the direction which is perpendicular to the direction of advance of the laser beam and parallel with the reflecting surfaces of the multiple reflecting mirror unit, whereby, in shaping a laser beam, the energy loss of the laser beam is minimized, and the laser beam is made uniform in energy distribution, and the laser beam can be changed in configuration and dimension according to the contents of a laser beam machining operation.

5 Claims, 4 Drawing Sheets

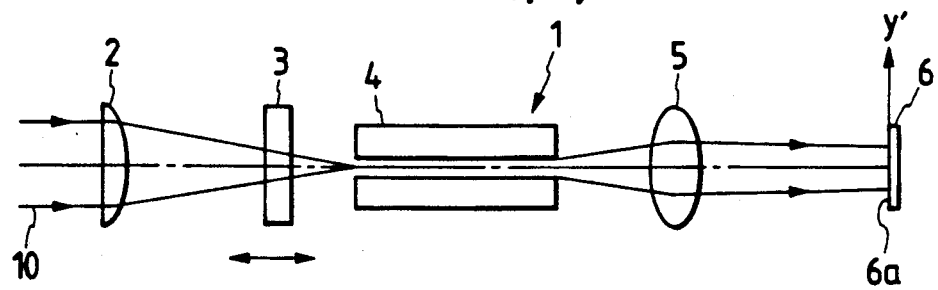
FIG. 1(a)
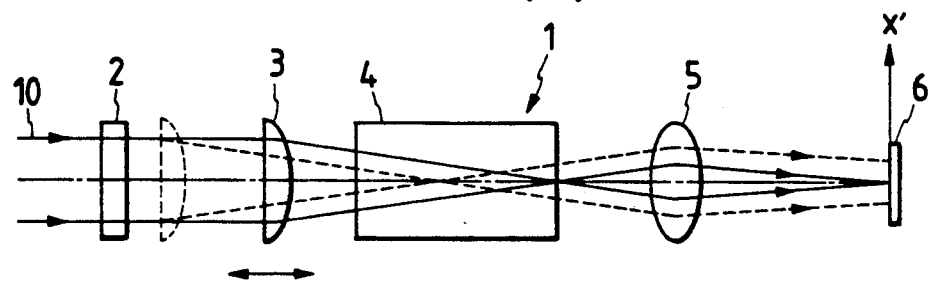
FIG. 1(b)
FIG. 2
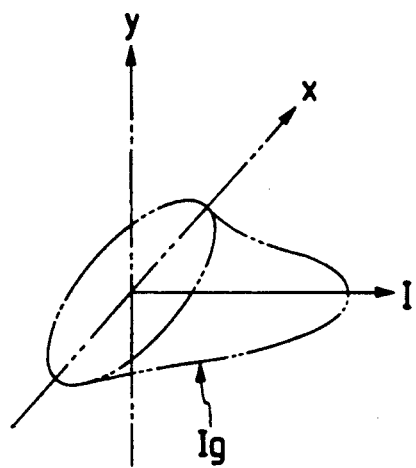
FIG. 3
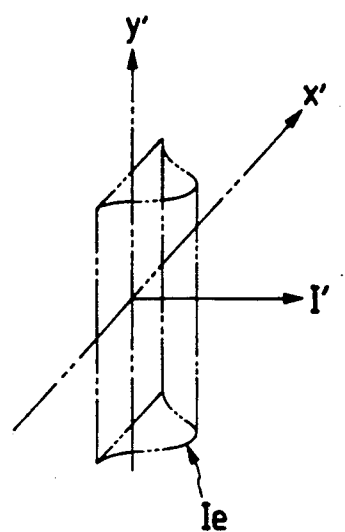

5,080,474

LASER BEAM SHAPING DEVICE

BACKGROUND OF THE INVENTION

This invention relates to a laser beam shaping device suitable for unifying the energy distribution pattern of a laser beam on the surface irradiated thereby, and more particularly to a laser beam shaping device which is suitable for forming a laser beam which, being uniform in energy distribution, can be effectively utilized in a wide range of technical fields in which a laser beam is used for surface treatment such as trimming, film removing, etching, hardening, and chilling or alloying by remelting surfaces, or joining, welding, and fusing.

A few examples of conventional laser beam shaping devices will be described with reference to FIGS. 12 through 15.

A first example of the conventional laser beam shaping device, as shown in FIG. 12, employs segment mirrors. More specifically, the laser beam shaping device 101 has a beam shaping mirror 104 in which segments mirrors 103 for reflecting a laser beam are arranged in matrix form. The laser beam 102b reflected from the beam shaping mirror 104 is applied to an irradiation surface 105. The segment mirrors 103 forming the beam shaping mirror 104 adjust the incident angle of the laser beam 102a so that the laser beam 102b applied to the irradiation surface 105 is uniform in energy distribution.

A second example of the conventional laser beam shaping device is as shown in FIG. 13. It is a beam shaping device 111 using a kaleidoscope. The device 111 comprises: a condenser lens for concentrating a laser beam 112a into a laser beam 112b; a kaleidoscope 114 having a reflecting wall 114a which reflects the laser beam 112b in a multiplex mode; and a focusing lens 115 for forming the output laser beam 112c of the kaleidoscope 114 into a laser beam 112 which is applied to the irradiation surface 116. The laser beam 112b passed through the condenser lens 113 is applied to the kaleidoscope 114, and reflected by the reflecting wall 114a in a multiplex mode. As a result, it is outputted as the laser beam 112c uniform in energy distribution by the kaleidoscope 114.

FIG. 14 shows a third example of the conventional laser beam shaping device, a beam shaping device 121 of beam oscillation type. The device 121 comprises: a condenser lens 123 for concentrating a laser beam 122a to form it into a laser beam 122b; a reflecting mirror 124 for reflecting the laser beam 122b to output it as a laser beam 122c; a scanning reflecting mirror 125 for deflecting the laser beam 122c in a scanning manner so as to be applied, as a laser beam 122d, to the irradiation surface 127; and a scanner 126 for controlling the operation of the scanning reflecting mirror 125. The laser beam 122c reflected from the reflecting mirror 124 is applied to the scanning reflecting mirror 125, while the latter 125 is controlled by the scanner 126, so that the laser beam 122c is deflected in a scanning manner; that is, the laser beam 122d is applied to the irradiation surface 127 in an oscillation mode.

A fourth example of the conventional laser beam shaping device, as shown in FIG. 15, is a laser beam shaping device using a polygon mirror. The device 131 comprises: a focusing reflecting mirror 133 for reflecting a laser beam 132a and simultaneously focusing it into a laser beam 132b; and a polygon mirror 134 for deflecting the laser beam 132 in a scanning manner so that it is applied, as a laser beam 132c, to the irradiation surface 135. The laser beam 132b is applied to a reflecting mirror 134a of the polygon mirror 134 which is kept rotated in the direction of the arrow A. As the polygon mirror turns, the reflecting mirror 134a is also turned, so that the laser beam 132c is deflected in the direction of the arrow B. Thus, the irradiation surface 135 is repeatedly irradiated by the laser beam.

In the conventional laser beam shaping device 101 shown in FIG. 12, the beam shaping mirror 104 made up of a number of segment mirrors 103 arranged in matrix form is used. Therefore, it requires complex manufacturing techniques, and it is accordingly high in manufacturing costs. Furthermore, the configuration of the laser beam 102b applied to the irradiation surface 105 cannot be changed without replacing the segment mirror 103. In addition, it should be noted that there are gaps between the segment mirrors 103, which lowers the factor of reflection of the laser beam 102a, and increases the energy loss.

In the conventional laser beam shaping device 111 using the kaleidoscope 114 shown in FIG. 13, the laser beam 112b is reflected in the kaleidoscope 114. However, its incident angle to the reflecting wall 114a being large, the absorption of the P polarization component by the reflecting wall 114a is large accordingly, resulting in an increase in the energy loss by the multiple reflection at the reflecting wall 114a. Since the beam configuration is determined by the configuration of the reflecting wall 114a of the kaleidoscope 114, it is rather difficult to change the beam configuration.

In the conventional laser beam shaping device of beam oscillation type shown in FIG. 14, it is difficult to deflect the laser beam at high frequency in a scanning mode, and accordingly it is difficult to obtain a laser beam 122d over the irradiation surface 127 which is uniform in energy distribution. In addition, the scanner 126 itself is not high enough in durability.

The fourth example of the conventional laser beam shaping device, using the polygon mirror as shown in FIG. 15, is also disadvantageous in that, when defocused, the irregularity in mode of the laser beam 132a adversely affects the machining capacity, and therefore it is necessary to make the spot diameter of the laser beam small to oscillate the latter. In addition, it is difficult to maintain the durability of the driving means and adjust the alignment.

In each of the first through fourth examples of the conventional laser beam shaping device, the reflection of the laser beam at the irradiation surface results in a large energy loss thereof, and it is therefore necessary to form a coating on the irradiation surface to increase the absorption of the laser beam.

SUMMARY OF THE INVENTION

Accordingly, an object of this invention is to eliminate the above-described difficulties accompanying a conventional laser beam shaping device.

More specifically, an object of the invention is to provide a laser beam shaping device in which, in shaping a laser beam, the energy loss of the laser beam is minimized, and the laser beam is made uniform in energy distribution, and the laser beam can be changed in configuration and dimension according to the contents of a laser beam machining operation, and in addition it is not always necessary to provide a reflection loss preventing coating on the surface to be machined.

The foregoing object and other objects of the invention has been achieved by the provision of a laser beam shaping device which, according to the invention, comprises: a reflecting optical system having a multiple reflecting mirror unit in which reflecting surfaces face each other for providing multiple reflections; a light gathering optical system for gathering the laser beam near the inlet of the multiple reflecting mirror unit; an image-forming optical system for focusing the laser beam emerging from the outlet of the multiple reflecting mirror unit; and a cylindrical optical system provided on at least one of the optical axes of the laser beams incident to and emergent from the multiple reflecting mirror unit, for setting the width of the laser beam in the direction which is perpendicular to the direction of advance of the laser beam and parallel with the reflecting mirrors of the multiple reflecting mirror unit.

In the laser beam shaping device according to the invention, preferably the cylindrical optical system is movable back and forth along the optical axis of the laser beam, and the width of the laser beam can be continuously changed in the direction which is perpendicular to the direction of advance of the laser beam and parallel with the reflecting surfaces of the multiple reflecting mirror unit.

Furthermore, in the laser beam shaping device of the invention, it is preferable, as the case may be, that a linearly polarized laser beam is used; that is, the linearly polarized laser beam in which the direction of oscillation of the electric field is perpendicular to the incident surface of the reflecting optical system is reflected in the reflecting optical system so that the latter system provides a large reflection factor. In addition, the direction of oscillation of the electric field of the linearly polarized laser beam passing through the image-forming optical system is preferably in parallel with the laser beam incident surface of the workpiece so that the laser beam absorbing percentage of the processing surface of the workpiece be increased, as the case may be.

The light gathering optical system used to gather the laser beam near the inlet of the multiple reflecting mirror unit forming the reflecting optical system may be made up of a cylindrical lens, cylindrical mirror, spherical lens or spherical mirror, or by using them in combination.

As was described above, the cylindrical optical system is used to set or continuously change the width of the laser beam in the direction that is perpendicular to the direction of advance of the laser beam and parallel with the reflecting surfaces of the multiple reflecting mirror unit. The cylindrical optical system may be made up of a cylindrical lens or cylindrical mirror, or by using them in combination. In the latter case, it is desirable as the case may be that one of the cylindrical lens and cylindrical mirror is made movable back and forth along the optical axis of the laser beam so as to continuously change the width of the laser beam.

The reflecting optical system may be made up of planar reflecting mirrors which are held in parallel with each other or inclined to each other, or curved reflecting mirrors confronted with each other.

The image-forming optical system may be made up of an image-forming lens or image-forming mirror, or by using them in combination. The image-forming optical system may be made movable back and forth along the optical axis of the laser beam so as to change the configuration of the laser beam.

In addition, it is preferable to tilt the processing surface of the workpiece with respect to the direction of advance of the laser beam as the case may be.

In the laser beam shaping device thus constructed, the linearly polarized laser beam is applied to the light gathering optical system so as to be gathered near the inlet of the multiple reflecting mirror unit in the reflecting optical system.

The laser beam thus gathered is reflected in multiple by the multiple reflecting mirror unit. In this case, the laser beam linearly polarized is preferably multiply reflected in such a manner that the direction of oscillation of the electric field thereof is perpendicular to the incident surface of reflecting optical system, with the result that the energy loss is minimized which is due to the absorption of the laser beam in the reflecting optical system. Providing the laser beam in multiple reflectors with the multiple reflecting mirror unit makes the laser beam uniform in energy distribution in the direction perpendicular to the reflecting surfaces of the multiple reflecting mirror unit.

The cylindrical optical system is provided on at least one of the optical axes of the laser beams incident to and emergent from the reflecting optical system. Before or after the laser beam passes through the reflecting optical system, the width of the laser beam is set in the direction which is perpendicular to the direction of advance of the laser beam and parallel with the reflecting surfaces of the multiple reflecting mirror unit. When necessary, the cylindrical optical system is moved back and forth along the optical axis of the laser beam to continuously change the width of the laser beam.

The laser beam emerging from the reflecting optical system is allowed to pass through the image-forming optical system before or after passing through the cylindrical optical system, so as to be focused on the laser processing surface for instance. More preferably, it is applied thereto in such a manner that the direction of oscillation of the electric field of the laser beam is in parallel with the laser beam incident surface of the workpiece, whereby the laser beam is made uniform in energy distribution with the energy absorbing percentage of the laser processing surface increased.

The nature, principle and utility of the invention will become more apparent from the following detailed description and the appended claims when read in conjunction with the accompanying drawings.

BRIEF DESCRIPTION OF THE DRAWINGS

In the accompanying drawings:

The parts (a) and (b) of FIG. 1 are an explanatory side view and an explanatory plan view showing the arrangement of essential components of a first example of a laser beam shaping device according to this invention;

FIG. 2 is an explanatory diagram view showing the energy distribution of a laser beam applied to a light gathering optical system in the device;

FIG. 3 is an explanatory diagram showing the energy distribution of the laser beam applied to the processing surface of a workpiece to be processed with it;

DETAILED DESCRIPTION OF THE INVENTION

Figure 4:
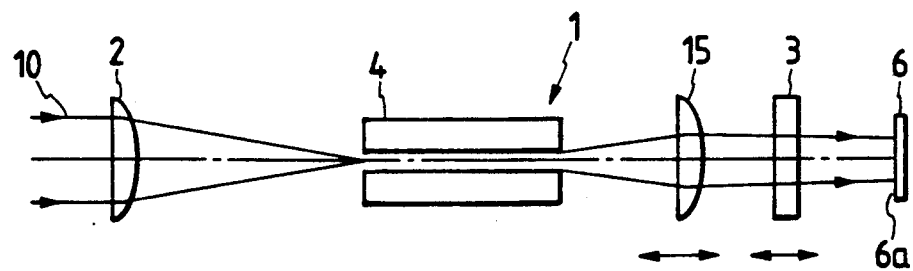
FIGS. 4 through 11 are explanatory side views showing the arrangements of essential components of second through ninth examples of the laser beam shaping device according to the invention, respectively.

Preferred embodiments of this invention will be described with reference to the accompanying drawings.

First Embodiment

A first example of a laser beam shaping device according to the invention will be described with reference to FIGS. 1 through 3.

The laser beam shaping device 1, as shown in FIG. 1, comprises: a light gathering cylindrical lens 2 forming a light gathering optical system adapted to concentrate a single mode laser beam 10 as shown in FIG. 2; a beam width setting cylindrical lens 3 forming a cylindrical optical system adapted to set the width of the laser beam 10 in a predetermined direction (described later), the cylindrical axis thereof being perpendicular to that of the above-described light gathering cylindrical 2; a multiple reflecting mirror unit 4 for reflecting the laser beam 10 in multiple reflections which has passed through the cylindrical lenses 2 and 3; and an image-forming spherical lens 5 forming an image forming optical system adapted to focusing the laser beam thus reflected in multiple on the processing surface 6a of a workpiece 6 to be processed. The light gathering cylindrical lens 2, the beam width setting cylindrical lens 3, the multiple reflecting mirror unit 4, and the image-forming spherical lens 5 are arranged in the direction of advance of the laser beam 10 in the stated order.

The cylindrical axis of the light gathering cylindrical lens is perpendicular to the optical axis of the laser beam 10 and parallel with the reflecting surfaces of the multiple reflecting mirror unit 4. The light gathering cylindrical lens 2 is disposed at the position near the inlet of the multiple reflecting mirror unit 4 where the laser beam 10 is gathered so that the laser beam 10 passed through the light gathering cylindrical lens is reflected by the multiple reflecting mirror unit 4 in multiple reflections.

The beam width setting cylindrical lens 3 is arranged between the light gathering cylindrical lens 2 and the multiple reflecting mirror unit 4 in such a manner that the cylindrical axis of the light gathering cylindrical lens 2 is perpendicular to that of the beam width setting cylindrical lens 3, and the cylindrical axis of the latter 3 is perpendicular to the optical axis of the laser beam 10. Furthermore, the beam width setting cylindrical lens is so positioned that, at the outlet of the multiple reflecting mirror unit 4, the laser beam has a predetermined width in the direction which is perpendicular to the optical axis of the laser beam 10 and parallel to the reflecting surfaces of the multiple reflecting mirror unit 4. In the embodiment, the beam width setting cylindrical lens 3 is movable along the optical axis of the laser beam 10 so that the above-described widths of the laser beam 10 at the outlet of the multiple reflecting mirror unit 4 can be changed continuously.

The multiple reflecting mirror unit 4 is made up of two multiple reflecting mirrors which are arranged in parallel with each other with the reflecting surfaces facing each other.

The spherical lens 5 is a convex lens.

In the laser beam shaping device thus constructed, a linearly polarized laser beam 10 having a Gaussian shaped energy distribution (Ig) with respect to the axis I as shown in FIG. 2 and having a polarization vector in parallel with the y-axis is applied to the light gathering cylindrical lens 2 so as to be gathered near the inlet of the multiple reflecting mirror unit 4, and it is then refracted by the beam width setting cylindrical lens 3 so that it has a desired beam width at the outlet of the multiple reflecting mirror unit 4. The laser beam thus refracted is applied to the multiple reflecting mirror unit 4. In the multiple reflecting mirror unit 4, the laser beam 10 is reflected in multiple reflections, so that it is made uniform in the direction of confrontation of the reflecting surfaces of the multiple reflecting mirrors, and is then applied to the image-forming spherical lens 5 so as to be focused on the processing surface 6a of the workpiece 6. Thus, the laser beam 10 has been so shaped that, as shown in FIG. 3, it has a uniform energy distribution, intensity (Ie), in the direction of the y'-axis perpendicular to the I'-axis representing energy intensity and a Gaussian shaped energy distribution in the direction of the x'-axis.

In the above-described embodiment, the linearly polarized laser beam 10 with the polarization vector in parallel with the x-axis passes through the light gathering cylindrical lens 2 and the beam width setting cylindrical lens 3; however, the polarization is not particularly affected during the passage. The laser beam of S polarization high in reflection factor is reflected in multiple reflections by the reflecting surfaces of the multiple reflecting mirror unit 4 forming the reflecting, as a result of which it is so shaped as to have the Gaussian shaped energy distribution along the x'-axis, and the uniform energy distribution along the y'-axis.

Thus, the laser beam 10 is made uniform in energy distribution by being reflected in multiple reflections by the multiple reflecting mirror unit 4, and when passing through the spherical lens 5, the laser beam 10 thus shaped is formed into a laser beam having a uniform energy pattern Ie in energy intensity, which is applied to the processing surface 6a inclined about the y'-axis.

Thus, the laser beam 10 applied to the processing surface 6a is essentially of P polarization, being less in reflection loss. Accordingly, the laser energy absorption percentage is considerably high on the processing surface 6a of the workpiece 6. That is, even if no light absorbing coating is formed on the processing surface of the workpiece, the laser beam energy is greatly absorbed by the processing surface. It goes without saying that the provision of the light absorbing coating will allow the processing surface to absorb laser energy more.

Second Embodiment

FIG. 4 shows a second example of the laser beam shaping device according to the invention. The laser beam shaping device, as shown in FIG. 4, comprises: a light gathering cylindrical lens 2 forming a light gathering optical system adapted to gather light near the inlet of a multiple reflecting mirror unit 4; the multiple reflecting mirror unit 4 for reflecting in multiple the laser beam 10 passed through the cylindrical lens 2 so that the laser beam 10 has a uniform energy distribution; and an image-forming cylindrical lens 15 forming an image-forming optical system adapted to focusing the laser beam 10 thus reflected in multiple reflections on the processing surface 6a of a workpiece 6 to be processed; and a beam width setting cylindrical lens 3 forming a cylindrical optical system adapted to set the width of the laser beam 10 as required in the direction which is perpendicular to the optical axis of the laser beam 10 and parallel with the reflecting surfaces of the multiple reflecting mirror unit 4. Those components 2, 4, 15 and 3 are arranged in the direction of advance of the laser beam in the stated order.

In the laser beam shaping device shown in FIG. 4, the cylindrical axes of the cylindrical lenses 2 and 15 are in parallel with the reflecting surfaces of the multiple reflecting mirror unit 4, and the cylindrical axis of the beam width setting cylindrical lens 3 is perpendicular to the reflecting surfaces of the multiple reflecting mirror 4. The beam width setting cylindrical lens is movable along the optical axis of the laser beam so that the width of the laser beam 10 in the above-described directions is smoothly changed. In addition, the image-forming cylindrical lens is also movable along the optical axis of the laser beam 10 so that the laser beam 10 has a desired configuration on the processing surface 6a.

Third Embodiment

Figure 5:
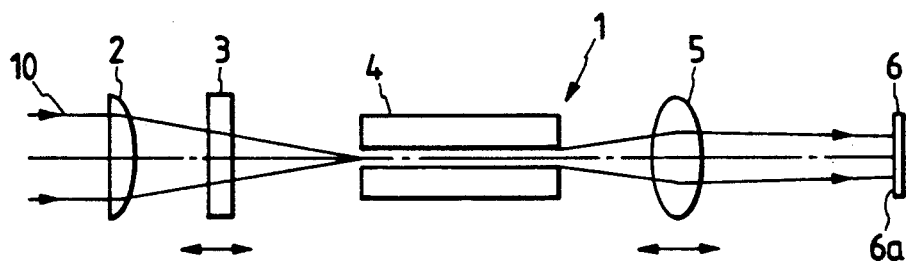

A third example of the laser beam shaping device according to the invention, as shown in FIG. 5, comprises: a light gathering cylindrical lens 2 forming a light gathering optical system adapted to gather a laser beam 10 near the inlet of a multiple reflecting mirror unit 4; a beam width setting cylindrical lens 3 forming a cylindrical optical system adapted to set the width of the laser beam 10 as required in the direction which is perpendicular to the optical axis of the laser beam 10 and parallel with the reflecting surfaces of the multiple reflecting mirror unit 4; the multiple reflecting mirror unit 4 for reflecting in multiple reflections the laser beam 10 passed through the cylindrical lenses 2 and 3 so that the laser beam 10 has a uniform energy distribution; and an image-forming spherical lens 5 forming an image- forming optical system adapted to focus the laser beam 10 thus reflected in multiple on the processing surface 6a of a workpiece 6 to be processed. Those components 2, 3, 4 and 5 are arranged in the direction of advance of the laser beam in the stated order.

In the laser beam shaping device, the cylindrical axis of the light gathering cylindrical lens 2 is in parallel with the reflecting surfaces of the multiple reflecting mirror unit 4, and the cylindrical axis of the beam width setting cylindrical lens 3 is perpendicular to the reflecting surfaces of the multiple reflecting mirror 4. The beam width setting cylindrical lens 3 is movable back and forth along the optical axis of the laser beam 10 so that the width of the laser beam can be changed continuously. The image-forming spherical lens 5 is also movable back and forth along the optical axis of the laser beam 10 so that the laser beam 10 has a desired configuration on the processing surface 6a of the workpiece 6.

Fourth Embodiment

Figure 6:
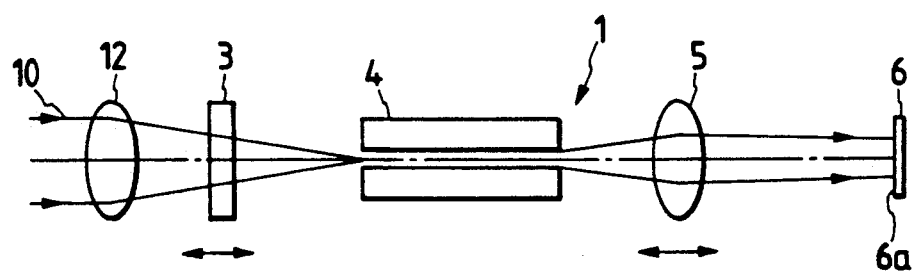

A fourth example of the laser beam shaping device according to the invention is as shown in FIG. 6. The device comprises: a light gathering spherical lens 12 forming a light gathering optical system adapted to gather a laser beam 10 near the inlet of a multiple reflecting mirror unit 4; a beam width setting cylindrical lens 3 forming a cylindrical optical system adapted to set the width of the laser beam 10 as desired in the direction which is perpendicular to the optical axis of the laser beam 10 and parallel with the reflecting surfaces of the multiple reflecting mirror unit 4; the multiple reflecting mirror unit 4 for reflecting in multiple reflections the laser beam 10 passed through the lenses 12 and 3 so that the laser beam 10 has a uniform energy distribution; and an image-forming spherical lens 5 forming an image-forming optical system adapted to focus the laser beam 10 thus reflected in multiple reflections on the processing surface 6a of a workpiece 6 to be processed. Those components 12, 3, 4 and 5 are arranged in the direction of advance of the laser beam in the stated order.

In the laser beam shaping device shown in FIG. 6, the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam in the above-described directions can be changed continuously. The image-forming spherical lens 5 is also movable back and forth along the optical axis of the laser beam so that the laser beam has a desired configuration on the processing surface 6a of the workpiece 6.

Fifth Embodiment

Figure 7:
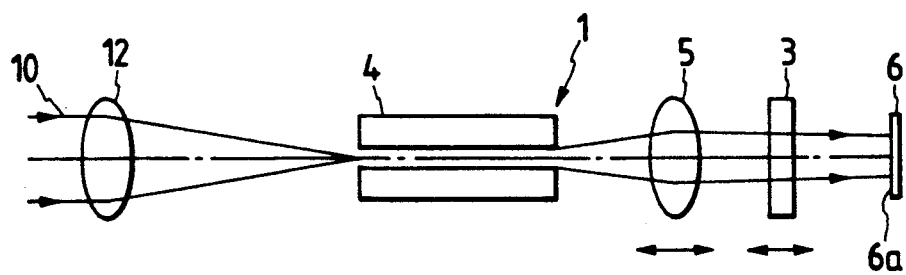

FIG. 7 shows a fifth example of the laser beam shaping device according to the invention. The laser beam shaping device 1, as shown in FIG. 7, comprises: a light gathering spherical lens 12 forming a light gathering optical system adapted to gather a laser beam 10 near the inlet of a multiple reflecting mirror unit 4; the multiple reflecting mirror unit 4 for reflecting in multiple the laser beam 10 passed through the lens 12 so that the laser beam 10 has a uniform energy distribution; an image-forming spherical lens 5 forming an image-forming optical system adapted to focus the laser beam 10 thus reflected in multiple reflections on the processing surface 6a of a workpiece 6 to be processed; and a beam width setting cylindrical lens 3 forming a cylindrical optical system adapted to set the width of the laser beam 10 as desired in the direction which is perpendicular to the optical axis of the laser beam 10 and parallel with the reflecting surfaces of the multiple reflecting mirror unit. Those components 12, 4, 5 and 3 are arranged in the direction of advance of the laser beam in the stated order.

In the laser beam shaping device, the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam can be changed continuously in the above-described directions. The image-forming spherical lens 5 is also movable back and forth along the optical axis of the laser beam so that the laser beam has a desired configuration on the processing surface 6a of the workpiece 6.

Sixth Embodiment

Figure 8:
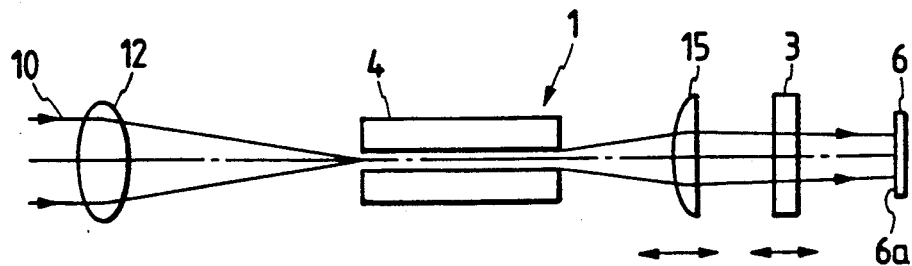

FIG. 8 shows a sixth example of the laser beam shaping device according to the invention. The laser beam shaping device comprises: a light gathering spherical lens 12 forming a light gathering optical system adapted to gather a laser beam 10 near the inlet of a multiple reflecting mirror unit 4; the multiple reflecting mirror unit 4 for reflecting in multiple reflections the laser beam 10 passed through the lens 12 so that the laser beam 10 has a uniform energy distribution; an image-forming cylindrical lens 15 forming an image-forming optical system adapted to focus the laser beam 10 thus reflected in multiple reflection on the processing surface 6a of a workpiece 6 to be processed; and a beam width setting cylindrical lens 3 forming a cylindrical optical system adapted to set the width of the laser beam 10 as desired in the direction which is perpendicular to the optical axis of the laser beam 10 and parallel with the reflecting surfaces of the multiple reflecting mirror unit. Those components 12, 4, 15 and 3 are arranged in the direction of advance of the laser beam 10 in the stated order.

In the laser beam shaping device, the cylindrical axis of the image-forming cylindrical lens 15 is in parallel with the reflecting surfaces of the multiple reflecting mirror unit 4, and the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam can be changed continuously in the above-described directions. The image-forming cylindrical lens 15 is also movable back and forth along the optical axis of the laser beam so that the laser beam has a desired configuration on the processing surface 6a of the workpiece 6.

Seventh Embodiment

Figure 9:
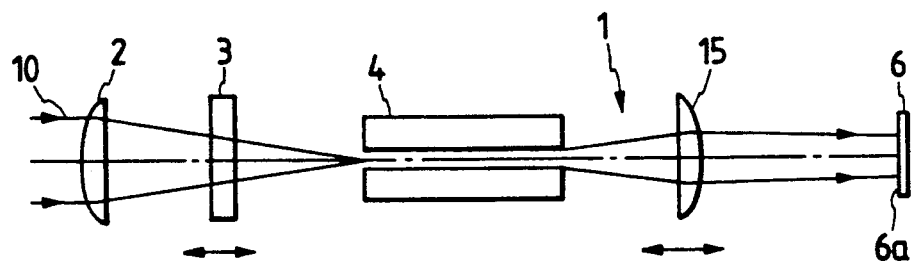

FIG. 9 shows a seventh example of the laser beam shaping device according to the invention. The device comprises: a light gathering cylindrical lens 2 forming a light gathering optical system adapted to concentrate a laser beam 10 near the inlet of a multiple reflecting mirror unit 4; a beam width setting cylindrical lens 3 forming a cylindrical optical system adapted to set the width of the laser beam 10 as required in the direction which is perpendicular to the optical axis of the laser beam and parallel with the reflecting surfaces of the multiple reflecting mirror unit 4; the multiple reflecting mirror unit 4 forming a reflecting optical system adapted to reflect in multiple reflections the laser beam 10 passed through the cylindrical lenses 2 and 3 so that the laser beam 10 has a uniform energy distribution; and an image-forming cylindrical lens 15 forming an image-forming optical system adapted to focus the laser beam 10 thus reflected in multiple reflections on the processing surface 6a of a workpiece 6. Those optical components are arranged in the direction of advance of the laser beam in the stated order.

In the laser beam shaping device shown in FIG. 9, the cylindrical axes of the light gathering cylindrical lens 2 and the image-forming cylindrical lens 15 are in parallel with the reflecting surfaces of the multiple reflecting mirror unit 4, and the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam can be changed continuously in the above-described directions. The image-forming cylindrical lens 15 is also movable back and forth along the optical axis of the laser beam so that the laser beam has a desired configuration on the processing surface 6a of the workpiece 6.

Eighth Embodiment

Figure 10:
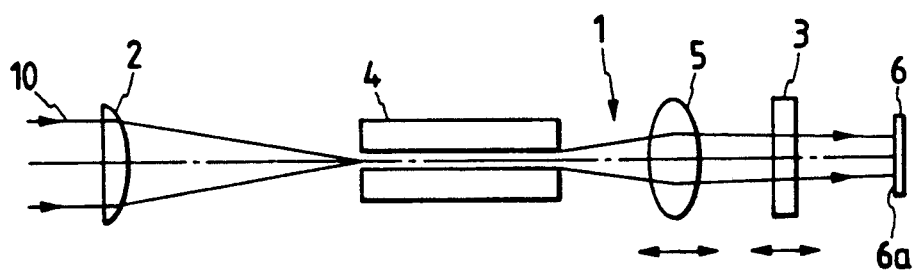

An eight example of the laser beam shaping device according to the invention is as shown in FIG. 10. The device comprises: a light gathering cylindrical lens 2 forming a light gathering optical system adapted to concentrate a laser beam 10 near the inlet of a multiple reflecting mirror unit 4; the multiple reflecting mirror unit 4 forming a reflecting optical system adapted to reflect in multiple reflections the laser beam 10 passed through the cylindrical lens so that the laser beam 10 has a uniform energy distribution; and an image-forming spherical lens 5 forming an image-forming optical system adapted to focus the laser beam 10 thus reflected in multiple reflections on the processing surface 6a of a workpiece 6; and a beam width setting cylindrical lens 3 forming a cylindrical optical system adapted to set the width of the laser beam 10 as required in the direction which is perpendicular to the optical axis of the laser beam and parallel with the reflecting surfaces of the multiple reflecting mirror unit. Those optical components 2, 4, 5 and 3 are arranged in the direction of advance of the laser beam in the stated order.

In the laser beam shaping device of FIG. 10, the cylindrical axis of the light gathering cylindrical lens 2 is in parallel with the reflecting surfaces of the multiple reflecting mirror unit 4, and the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam can be changed continuously in the above-described directions. The image-forming spherical lens 5 is also movable back and forth along the optical axis of the laser beam so that the laser beam has a desired configuration on the processing surface 6a of the workpiece 6.

Ninth Embodiment

Figure 11:
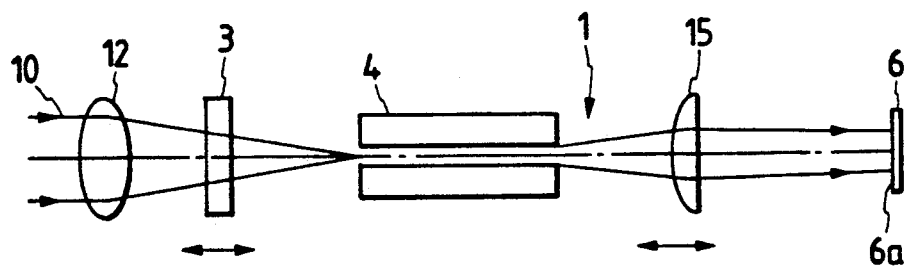
Figure 12:
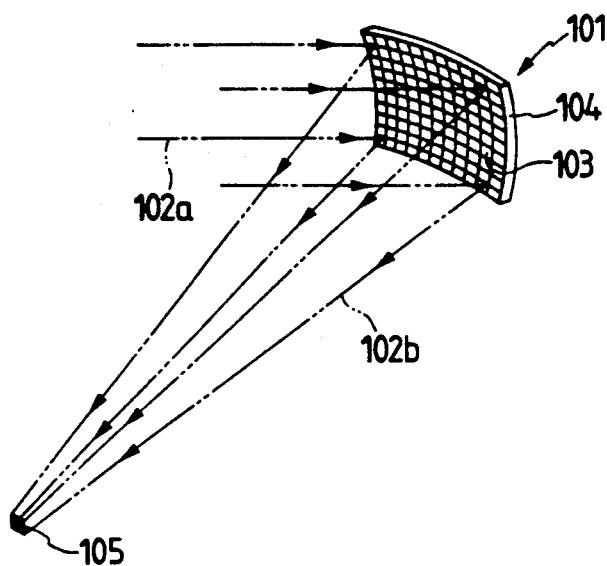
FIG. 12 is an explanatory diagram showing the arrangement of essential components of a conventional integration type beam shaping device.
Figure 13:
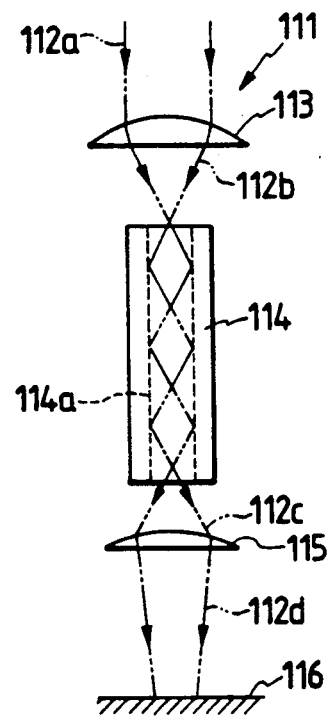
FIG. 13 is an explanatory diagram showing the arrangement of essential components of a conventional kaleidoscope type beam shaping device.
Figure 14:
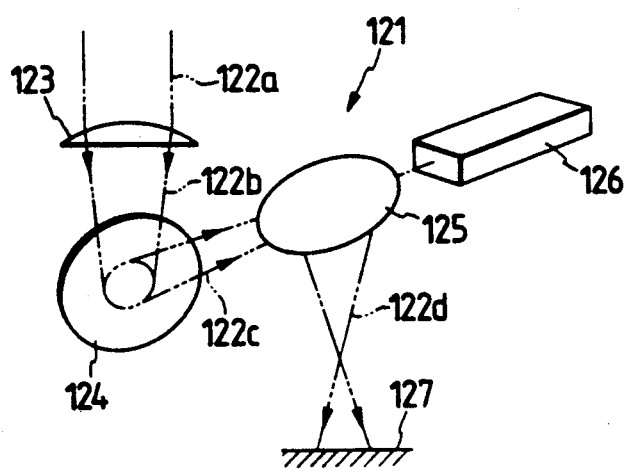
FIG. 14 is an explanatory diagram showing the arrangement of essential components of a conventional oscillation type beam shaping device.
Figure 15:
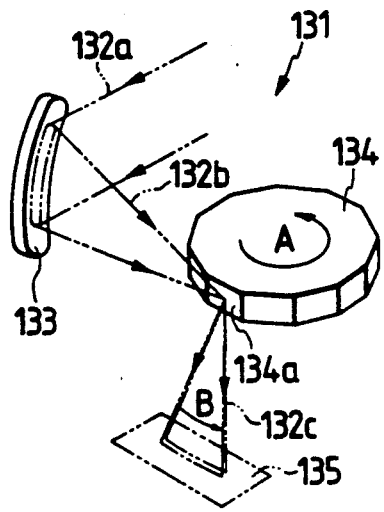
FIG. 15 is an explanatory diagram showing the arrangement of essential components of a conventional polygon mirror type beam shaping device.

FIG. 11 shows a ninth example of the laser beam shaping device according to the invention. The laser beam shaping device comprises: a light gathering spherical lens 12 forming a light gathering optical system adapted to concentrate a laser beam 10 near the inlet of a multiple reflecting mirror unit 4; a beam width setting cylindrical lens 3 forming a cylindrical optical system adapted to set the width of the laser beam 10 as required in the direction which is perpendicular to the optical axis of the laser beam and parallel with the reflecting surfaces of the multiple reflecting mirror unit 4; the multiple reflecting mirror unit 4 forming a reflecting optical system adapted to reflect in multiple reflections the laser beam 10 passed through the lenses 12 and 3 so that the laser beam 10 has a uniform energy distribution; and an image-forming cylindrical lens 15 forming an image-forming optical system adapted to focus the laser beam 10 thus reflected in multiple reflections on the processing surface 6a of a workpiece 6. Those optical components 12, 3, 4 and 15 are arranged in the direction of advance of the laser beam in the stated order.

In the device of FIG. 11, the cylindrical axis of the image-forming cylindrical lens 15 is in parallel with the reflecting surfaces of the multiple reflecting mirror unit 4, and the cylindrical axis of the beam width setting cylindrical lens 3 is perpendicular to the reflecting surfaces of the multiple reflecting mirror unit 4. In addition, the cylindrical lens 3 is movable back and forth along the optical axis of the laser beam 10 so that the width of the laser beam can be changed continuously in the above-described directions. The image-forming cylindrical lens 15 is also movable back and forth along the optical axis of the laser beam so that the laser beam has a desired configuration on the processing surface 6a of the workpiece 6.

In the above-described laser beam shaping devices, part of the light gathering optical system, part of the image-forming optical system, and the cylindrical optical system employ the cylindrical lenses 2, 15 and 3, respectively; however, the devices may be so modified as to use cylindrical mirrors instead. In addition, the spherical lenses 5 and 12 are image-forming or light gathering convex lenses; however, the devices may be so modified as to use image-forming or light gathering concave lenses.

In the above-described embodiments, the multiple reflecting mirror unit 4 is made up of a pair of multiple reflecting mirrors arranged in such a manner that the reflecting surfaces are held in parallel with each other and facing each other. However, the multiple reflecting mirror unit 4 may be replaced by an inclined type multiple reflecting mirror unit with planar reflecting mirrors inclined to each other, or a curved type multiple reflecting mirror unit with curved reflecting surfaces having a predetermined curvature confronted with each other. In the latter case, the curved reflecting surfaces should be so positioned that they are equally spaced from each other in the directions of all the normals thereto.

Effects of the Invention

As was described above, the laser beam shaping device according to the invention comprises: the reflecting optical system having the multiple reflecting mirror unit in which the reflecting surfaces face each other to reflect the laser beam in multiple reflections; the light gathering optical system for gathering the laser beam near the inlet of the multiple reflecting mirror unit; the image-forming optical system for focusing the laser beam emerging from the outlet of the multiple reflecting mirror unit; and the cylindrical optical system provide on at least one of the optical axes of the laser beams incident to and emergent from the multiple reflecting mirror unit, for setting the width of the laser beam in the direction which is perpendicular to the direction of advance of the laser beam and parallel with the reflecting mirrors of the multiple reflecting mirror unit. Hence, in shaping a laser beam according to the invention, it can be made uniform in energy distribution with the energy loss minimized. For instance, by applying a $CO_2$ laser beam to the surface of a metal according to the invention, the surface can be improved in quality, being treated uniformly thereby. Furthermore, in the invention, the laser beam can be changed in configuration and in dimension according to the contents of a laser processing operation, and it is not always necessary to form a laser beam absorbing coating on the processing surface of the workpiece to be processed with the laser beam. These effects or merits of the invention should be highly appreciated.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A laser beam shaping device comprising:
   reflecting optical means for internally reflecting a laser beam in multiple reflections, said reflecting optical means having a multiple reflecting mirror unit in which reflecting surfaces are disposed facing each other;
   said multiple reflecting mirror unit having an inlet and an outlet for gathering and emerging said laser beam, respectively;
   a light gathering optical means for gathering said laser beam near the inlet of said multiple reflecting mirror unit;
   an image-forming optical means for focusing said laser beam emerging from the outlet of said multiple reflecting mirror unit; and
   a cylindrical optical means for setting the width of said laser beam in the direction which is perpendicular to the direction of advance of said laser beam and parallel with said reflecting mirrors of said multiple reflecting mirror unit, wherein said cylindrical optical means is movable back and forth along the optical axis of said laser beam.

2. A laser beam shaping device comprising:
   reflecting optical means for internally reflecting a laser beam in multiple reflections, said reflecting optical means having a multiple reflecting mirror unit in which reflecting surfaces are disposed facing each other;
   said multiple reflecting mirror unit having an inlet and an outlet for gathering and emerging said laser beam, respectively;
   a light gathering optical means for gathering said laser beam near the inlet of said multiple reflecting mirror unit;
   an image-forming optical means for focusing said laser beam emerging from the outlet of said multiple reflecting mirror unit, wherein said image-forming optical means is movable back and forth along the optical axis of said laser beam; and
   a cylindrical optical means for setting the width of said laser beam in the direction which is perpendicular to the direction of advance of said laser beam and parallel with said reflecting mirrors of said multiple reflecting mirror unit.

3. A laser beam shaping device as claimed in claim 1 or 2, in which said cylindrical optical means is provided on at least one of the optical axes of said laser beams incident to and emergent from said multiple reflecting mirror unit.

4. A laser beam shaping device as claim in claim 1 or 2, in which said image-forming optical means is selected from a group composed of cylindrical lens and spherical lens.

5. A laser beam shaping device as claim in claim 1 or 2, in which said laser gathering means is selected from a group composed of cylindrical lens and spherical lens.

* * * * *